United States Patent
Park et al.

(10) Patent No.: US 10,459,273 B2
(45) Date of Patent: Oct. 29, 2019

(54) IN-CELL TOUCH LIQUID CRYSTAL DISPLAY DEVICE AND METHOD FOR FABRICATING THE SAME

(71) Applicant: LG DISPLAY CO., LTD., Seoul (KR)

(72) Inventors: Byung-Hoon Park, Seoul (KR); Jong-Sang Pyo, Paju-si (KR); Dong-Kug Ko, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 84 days.

(21) Appl. No.: 15/720,040

(22) Filed: Sep. 29, 2017

(65) Prior Publication Data
US 2018/0095316 A1    Apr. 5, 2018

(30) Foreign Application Priority Data
Sep. 30, 2016  (KR) .................... 10-2016-0126798

(51) Int. Cl.
*G02F 1/1333*  (2006.01)
*G02F 1/1343*  (2006.01)
*G06F 3/041*  (2006.01)
*G06F 3/044*  (2006.01)

(52) U.S. Cl.
CPC ........ *G02F 1/13338* (2013.01); *G02F 1/1343* (2013.01); *G02F 1/133345* (2013.01); *G06F 3/0412* (2013.01); *G06F 3/044* (2013.01); *G06F 2203/04103* (2013.01)

(58) Field of Classification Search
CPC ........... G02F 1/133345; G02F 1/13338; G02F 1/1343; H05K 9/0067; G06F 3/0412; G06F 2203/04103; G06F 3/044
See application file for complete search history.

(56) References Cited

U.S. PATENT DOCUMENTS

| | | | |
|---|---|---|---|
| 2013/0285970 A1* | 10/2013 | Ahn | G06F 3/044 345/173 |
| 2016/0306472 A1* | 10/2016 | Park | G06F 3/0412 |
| 2016/0328058 A1 | 11/2016 | Peng | |

FOREIGN PATENT DOCUMENTS

| | | |
|---|---|---|
| CN | 204204861 U | 3/2015 |
| CN | 104503162 A | 4/2015 |
| CN | 104808375 A | 7/2015 |
| CN | 105183220 A | 12/2015 |

(Continued)

*Primary Examiner* — Yaron Cohen
(74) *Attorney, Agent, or Firm* — Birch, Stewart, Kolasch & Birch, LLP

(57) ABSTRACT

An in-cell touch LCD in one example includes a lower array substrate; an upper array substrate having an area greater than the lower array substrate; gate and data lines and a thin film transistor on the inner surface of the upper array substrate; a planarization layer on the inner surface of the upper array substrate, and exposing a part of a drain electrode; a common electrode on the planarization layer; a passivation layer on the planarization layer and exposing the part of the drain electrode; a touch line on the passivation layer; an inter-layered insulating layer on the passivation layer, covering the touch line, and exposing the part of the drain electrode, the touch line and the common electrode; a plurality of pixel electrodes on the inter-layered insulating layer, overlapping the common electrode, and connected to the drain electrode; and a connection line connecting the touch line and the pixel electrodes.

14 Claims, 8 Drawing Sheets

(56) References Cited

FOREIGN PATENT DOCUMENTS

GB 2478853 A 9/2011
TW 201543317 A 11/2015

* cited by examiner

IN-CELL TOUCH LIQUID CRYSTAL DISPLAY DEVICE AND METHOD FOR FABRICATING THE SAME

CROSS REFERENCE TO RELATED APPLICATIONS

The present application claims the priority benefit of Korean Patent Application No. 10-2016-0126798 filed in Republic of Korea on Sep. 30, 2016, which is hereby incorporated by reference in its entirety for all purposes as if fully set forth herein.

BACKGROUND OF THE INVENTION

Field of the Invention

The present invention relates to a liquid crystal display device, and particularly, relates to an in-cell touch liquid crystal display device and a method for fabricating the same.

Discussion of the Related Art

Recently, various flat display devices to reduce weight and volume have been developed to address the disadvantages of a cathode ray tube (CRT). As the flat display devices, a liquid crystal display device (LCD), a field emission display device (FED), a plasma display panel device (PDP), an electroluminescence display device (EL) and so on are used.

Since these flat display devices are lightweight, they are used as display devices for mobile telecommunication terminals or portable information assistances. Particularly, for the mobile or portable devices, thinner, more lightweight, and less power-consumed display panels are required.

The flat display device displays an image using a gate driving circuit that supplies scan signals to gate lines of the display panel and a data driving circuit that supplies data voltages to data lines of the display panel. For example, a data driving portion, which is connected to the data lines using a TAB method, may be located at a side of a top portion of the display panel. A gate driving portion, which is connected to the gate lines using a TAB method, may be located at a side of a left portion of the display panel.

In the method that the gate and data driving portions are configured separately from, and are connected to, the display panel, a mounting region is required and thus a bezel region, which is an edge region of the display panel, occupies much space. As a demand for the flat display device increases and as a technology is developed, an outline design or various needs are required from an aesthetic point of view.

In this regard, a demand for the flat display device being minimized in the bezel region that is a black edge along 4 sides of the surface increases.

Recently, a touch panel technology to operate the flat display panel has been proposed.

Usually, a touch display panel includes a touch panel and a display unit overlapping the touch panel. The touch panel is designed as an operation interface. The touch panel is transparent such that an image produced by the display unit is not shielded by the touch panel and is seen to an user.

In the above known touch panel technology, a weight and a thickness of the touch display panel increases, a light penetration ratio of the touch display panel decreases, and a reflectance and a haze of the touch display panel increases.

To overcome these disadvantages, on-cell and in-cell touch technologies have been proposed.

An on-cell touch technology is that a touch sensor is located on a rear surface of a color filter substrate.

Another on-cell touch technology is that a touch sensor is located on a thin film and this thin film is attached to an upper substrate of two substrates.

The in-cell touch technology is that a touch sensor is located in a cell structure of a liquid crystal display panel. There are three in-cell touch technologies such as a resistive touch technology, a capacitive touch technology and an optical touch technology. The resistive touch technology uses a common electrode between two conductive substrates in order to decide a touch position on a touch display panel.

The in-cell touch liquid crystal display device (LCD) according to the related art is explained with reference to FIG. 1. More specifically, FIG. 1 is a schematic cross-sectional view illustrating an in-cell touch LCD according to the related art.

Referring to FIG. 1, in the related art in-cell touch LCD, a plurality of gate lines extending along a direction and being parallel with and spaced apart from each other, and a plurality of data lines 21 crossing the gate lines to define pixel regions are formed on an thin film transistor (TFT) array substrate 11.

A TFT is formed at the crossing portion of the gate line and the data line 21, and includes a gate electrode, an active layer, a source electrode and a drain electrode. A first passivation layer 23 is formed entirely on the TFT substrate 11 having the thin film transistor, and a planarization layer 25 is formed on the passivation layer 23. A drain contact hole is formed in the first passivation layer 23 and the planarization layer 25 and exposes a part of the drain electrode. A pixel electrode 27 is formed on the planarization layer 25 and is electrically connected to the drain electrode through the drain contact hole. A second passivation layer 28 is formed on the planarization layer 25. A touch line 29 is formed on the second passivation layer 28. An inter-layered insulating layer 31 is formed on the second passivation layer 28 and covers the touch line 29. A touch line contact hole is formed in the inter-layered insulating layer 31 and exposes a part of the touch line 29. A plurality of common electrodes 35 are formed on the inter-layered insulating layer 31, overlap the pixel electrode 27 and are connected to the touch line 29.

On a color filter (CF) array substrate 51, a black matrix 53 to block a light transmission to a region except for the pixel regions is formed. Red, green and blue color filters 55 are formed in the respective pixel regions of the CF array substrate 51.

To touch a surface of the CF array substrate 51 and achieve a touch function, a transparent conductive layer 57 having a high resistance is formed on a front surface of the CF array substrate 51. The conductive layer 57 is used as a touch material layer substituted for a prior ITO of a low resistance in order to prevent a finger capacitance and a static electricity.

A liquid crystal layer 61 is interposed between the TFT array substrate 11 and the CF array substrate 51 attached to each other.

The above-configured in-cell touch LCD provides a touch function using the transparent high-resistance conductive layer 57.

Processes of fabricating the in-cell touch LCD are explained with reference to FIG. 2. More specifically, FIG. 2 is a flow chart illustrating fabrication processes of an in-cell touch LCD according to the related art.

Referring to FIG. 2, the fabrication processes include a first mask process S11 of forming a gate line and a gate electrode on a TFT array substrate; a second mask process S12 of forming an active layer, a source electrode and a drain electrode on the gate electrode; a third mask process S13 of forming a drain contact hole, which exposes the drain electrode, in a planarization layer on the active layer, the source electrode and the drain electrode; a fourth mask process S14 of forming a pixel electrode electrically connected to the drain electrode through the drain contact hole; a fifth mask process S15 of forming a touch line overlapping a data line; a sixth mask process S16 of forming a touch line contact hole in an inter-layered insulating layer covering the touch line; and a seventh mask process S17 of forming a common electrode overlapping the pixel electrode and connected to the touch line.

Further, the fabrication processes include a mask process of forming a black matrix on a CF array substrate, and a mask process of forming a color filter in an opening of the black matrix on the CF array substrate.

After the above fabrication processes, a transparent conductive layer (57 of FIG. 1) of a high resistance is coated on a surface of the CF array substrate (51 of FIG. 1). The coating process of the conductive layer is conducted, separately from the fabrication processes of the TFT array substrate and the CF array substrate, under other process system.

FIG. 3 is a schematic view illustrating a static electricity path of an in-cell touch LCD according to the related art.

Referring to FIG. 3, in the related art in-cell touch LCD, a static electricity produced from the outside is discharged to the outside through a transparent high-resistance conductive layer 57, an Ag dot 91, a ground line 81 and a circuit portion.

However, according to the related art in-cell touch LCD, the transparent conductive layer 57 is coated separately from the fabrication processes of the TFT array substrate and the CF array substrate, and thus a coating spot caused by an organic substance existing on a rear surface of the CF array substrate happens.

Accordingly, to remove the coating spot, an additional etching and cleansing process is required. Thus, fabrication processes increase in the related art.

Further, since the transparent conductive layer of a high resistance is formed instead of a prior ITO, an electrostatic spot happens and an anti-static property is degraded. Thus, fabrication efficiency and touch sensitivity is reduced in the related art.

Further, since a distance (d1 of FIG. 1) between a finger (71 of FIG. 1) and a common electrode (35 of FIG. 1) is long, a finger capacitance (C1 of FIG. 1) is small, and since a touch area of the common electrode is small, a touch sensitivity is reduced in the finger touching according to the related art.

SUMMARY OF THE INVENTION

Accordingly, the present invention is directed to an in-cell touch LCD and a method for fabricating the same that substantially obviate one or more of the problems due to limitations and disadvantages of the related art.

An object of the present invention is to provide an in-cell touch LCD and a method for fabricating the same that can improve a touch performance and an electrostatic performance. Another object of the present invention is to provide an in-cell touch LCD and a method for fabricating the same that can remove a transparent high-resistance conductive layer, and thus simplify fabrication processes and reduce a fabrication cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an in-cell touch liquid crystal display device includes a lower array substrate; an upper array substrate that is on and faces the lower array substrate, and has an area greater than the lower array substrate; a gate line and a data line that are on an inner surface of the upper array substrate and cross each other to define a pixel region; a thin film transistor on the inner surface of the upper array substrate; a planarization layer that is on the inner surface of the upper array substrate having the thin film transistor, and exposes a part of a drain electrode of the thin film transistor; a common electrode on the planarization layer; a passivation layer that is on the planarization layer and exposes the part of the drain electrode; a touch line on the passivation layer; an inter-layered insulating layer that is on the passivation layer, covers the touch line, and exposes the part of the drain electrode, the touch line and the common electrode; a plurality of pixel electrodes that are on the inter-layered insulating layer, overlap the common electrode, and are connected to the drain electrode; and a connection line connecting the touch line and the pixel electrodes.

In another aspect, a method for fabricating an in-cell touch liquid crystal display device includes providing a lower array substrate, and an upper array substrate that is on and faces the lower array substrate, and has an area greater than the lower array substrate; forming a gate line and a data line that are on an inner surface of the upper array substrate and cross each other to define a pixel region; forming a thin film transistor on the inner surface of the upper array substrate; forming a planarization layer that is on the inner surface of the upper array substrate having the thin film transistor, and exposes a part of a drain electrode of the thin film transistor; forming a common electrode on the planarization layer; forming a passivation layer that is on the planarization layer and exposes the part of the drain electrode; forming a touch line on the passivation layer; forming an inter-layered insulating layer that is on the passivation layer, covers the touch line, and exposes the part of the drain electrode, the touch line and the common electrode; and forming a plurality of pixel electrodes that are on the inter-layered insulating layer, overlap the common electrode, and are connected to the drain electrode, and a connection line connecting the touch line and the pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to exemplary embodiments, examples of which are illustrated in the accompanying drawings. The same reference numbers may be used throughout the drawings to refer to the same or like parts.

Figure 1:
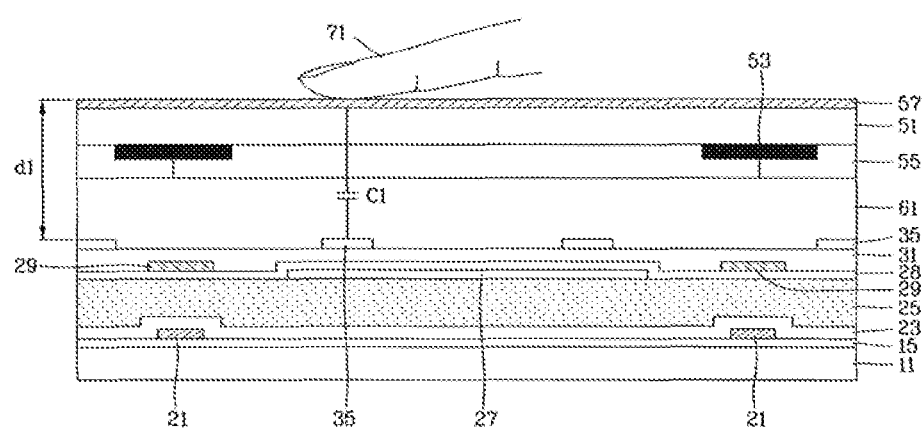
FIG. 1 is a schematic cross-sectional view illustrating an in-cell touch LCD according to the related art.
Figure 2:
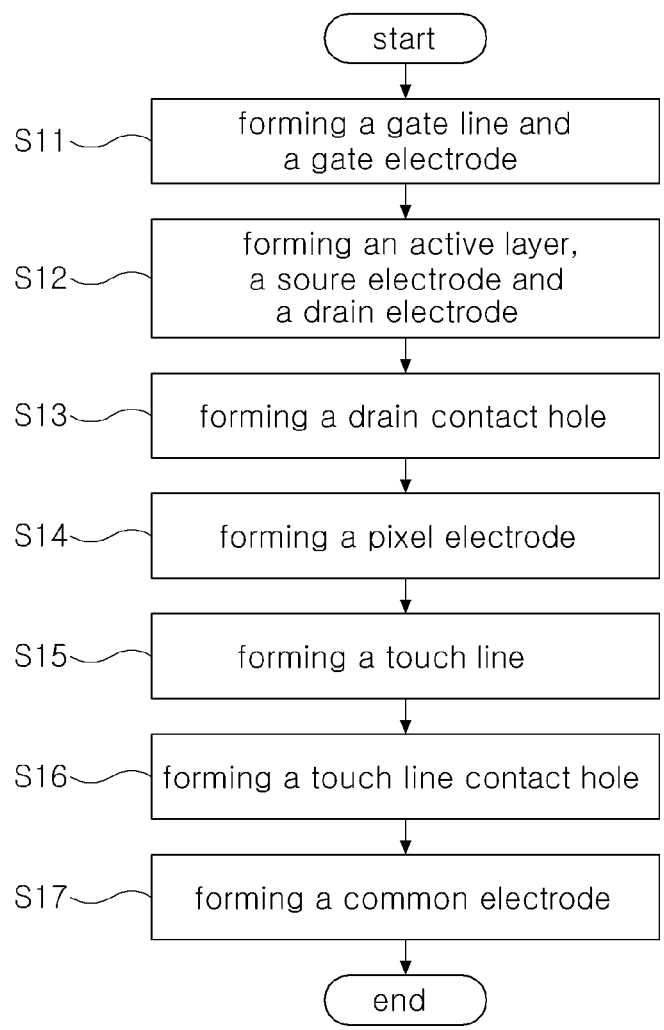
FIG. 2 is a flow chart illustrating fabrication processes of an in-cell touch LCD according to the related art.
Figure 3:
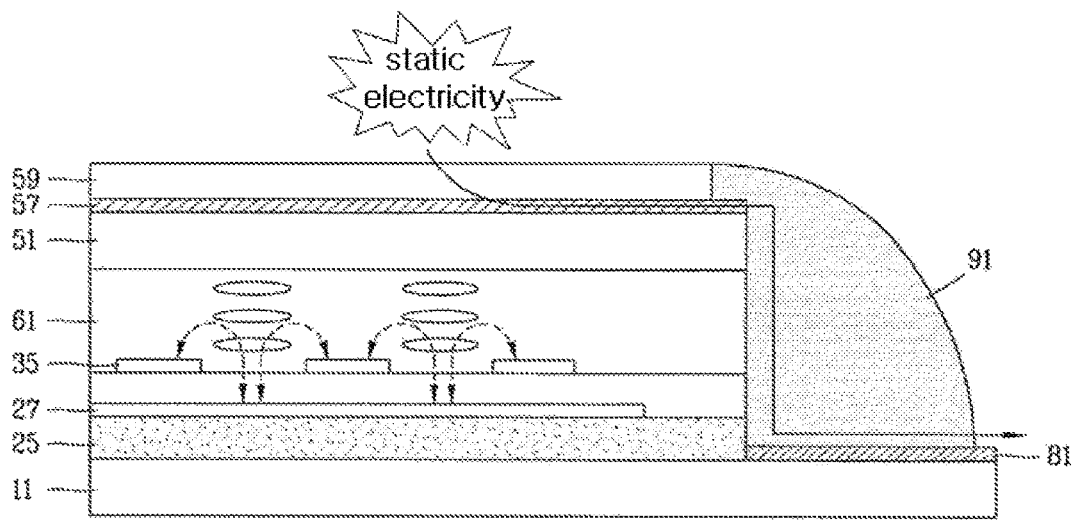
FIG. 3 is a schematic view illustrating a static electricity path of an in-cell touch LCD according to the related art.
Figure 4:
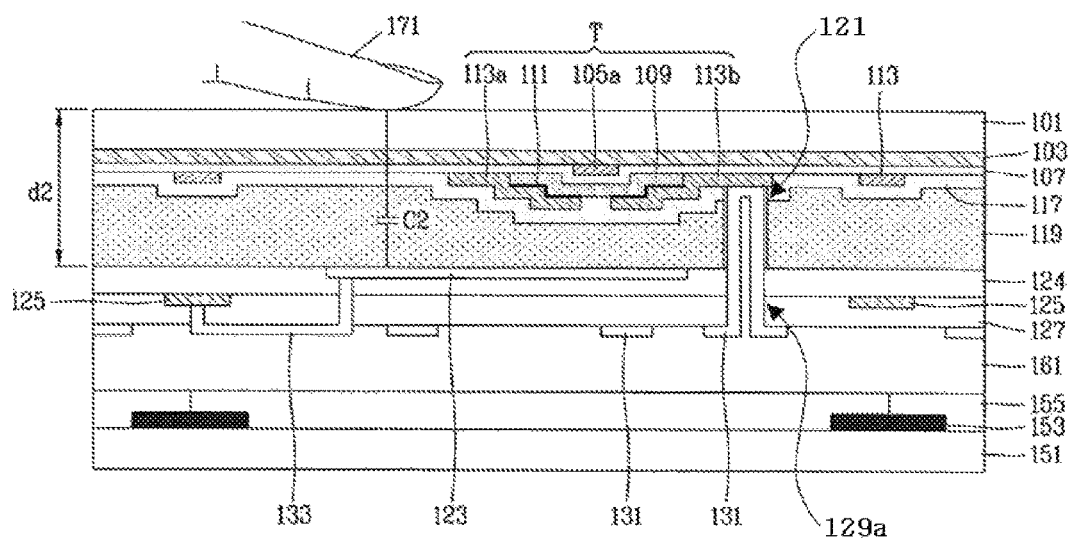
FIG. 4 is a schematic cross-sectional view illustrating a borderless type in-cell touch LCD according to an embodiment of the present invention.

FIG. 4 is a schematic cross-sectional view illustrating a boderless type in-cell touch LCD according to an embodiment of the present invention. All the components of the borderless type in-cell touch LCD according to all embodiments of the present invention are operatively coupled and configured.

FIG. 4 schematically shows a portion of a FFS (fringe field switching) type liquid crystal panel that a fringe field produced between a pixel electrode and a common electrode operates liquid crystal molecules located on a pixel region and a common electrode and to display an image. However, the present invention is not limited to this type LCD. For example, the present invention may be applied to an IPS (in-plane switching) type LCD or other types of flat panel display devices.

Referring to FIG. 4, in the boderless type in-cell touch LCD of this embodiment, an upper array substrate 101 is configured as an TFT array substrate, and a lower array substrate 151 is configures as a CF array substrate. In other words, unlike the related art, the TFT array substrate having a relatively larger area is located on the CF array substrate. At the upper array substrate, TFTs and various lines and electrodes are formed, and pixel regions are defined.

At the lower array substrate 151, color filters 155 to display three primary colors of red, green and blue, and a black matrix 153 to separate the pixel regions are formed. A lower polarizing plate is formed on an outer surface of the lower array substrate 151.

In other words, on the upper array substrate 101, a plurality of gate lines and a plurality of data lines 113 arranged in row and column lines to define a plurality of pixel regions, the TFT as a switching element at the crossing portion of the gate line and the data line 113, and a pixel electrode 131 in the pixel region are formed.

When the LCD is a vertical electric field type LCD such as a TN (twisted nematic) type LCD, a common electrode is formed on the lower array substrate 151. When the LCD is a horizontal electric field type LCD such as an IPS or FFS type LCD, a common electrode 127 and the pixel electrode 131 are together formed on the upper array substrate 101.

As shown in FIG. 4, a nitride insulating layer 103 is formed on an inner surface of the upper array substrate 101.

The nitride insulating layer 103 blocks a displaying of a color (e.g., yellow) that is produced from electrode lines made of a metal material such as copper thus improves a luminous reflection and thus improves a display property.

Further, on the inner surface of the upper array substrate 101, a plurality of gate lines extending along a direction and being parallel with each other, and a plurality of data lines 113 crossing the plurality of gate lines to define a plurality of pixel regions are formed.

The TFT T is formed at the crossing portion of the gate line and the data line 113. The TFT T includes a gate electrode 105a, an active layer 109, a source electrode 113a and a drain electrode 113b. A gate insulating layer 107 is formed on the nitride insulating layer 103 and covers the gate electrode 105a.

A first passivation layer 117 is formed entirely on the substrate 101 having the TFT T. A planarization layer 119 is formed on the first passivation layer 117.

An opening portion 121 is formed in the first passivation layer 117 and the planarization layer 119 and exposes a part of the drain electrode 113b of the TFT T.

A common electrode 123 and a touch line 125 are formed on the planarization layer 119 and are spaced apart from each other. The common electrode 123 may be formed in a large-size plate shape.

A second passivation layer 124 is formed on the planarization layer 119 and covers the common electrode 123. The touch line 125 is formed on the second passivation layer 124.

An inter-layered insulating layer 127 is formed on the second passivation layer 124 and covers the touch line 125.

A drain contact hole 129a is formed in the second passivation layer 124 and the inter-layered insulating layer 127 and exposes the part of the drain electrode 113b.

A plurality of pixel electrodes 131 are formed on the inter-layered insulating layer 127 in the pixel region and are electrically connected to the drain electrode 113b. The plurality of pixel electrodes 131 overlap the common electrode.

An upper alignment layer is formed entirely on the substrate 101 having the inter-layered insulating layer.

On an inner surface of the lower array substrate 151, a black matrix 153 to block a light transmission to a region except for the pixel regions is formed.

Red, green and blue color filters 155 are formed in the respective pixel regions of the lower array substrate 151. The black matrix 153 is located between the color filters 155.

An ITO may be additionally formed on a rear surface (or a bottom surface or outer surface) of the lower array substrate 151 and be served to prevent a static electricity, and in this case, a static electricity prevention property can be improved.

In attaching the upper array substrate 101 and the lower array substrate 151, the black matrix 153 is arranged such that it overlaps a region except for the pixel regions of the upper array substrate 101, for example, overlaps the TFTs T, the gate lines and the data lines 113.

A lower alignment layer is formed at a top surface of the lower array substrate 151.

When a data signal is supplied to the pixel electrodes 121 through the TFT T, a fringe field is produced between the pixel electrodes 131 and the large-sized common electrode 123, and liquid crystal molecules arranged in a horizontal direction between the upper array substrate 101 and the lower array substrate 151 are rotated by the fringe field. Accordingly, a transmittance of a light passing through the pixel region changes according to a rotation quantity of the liquid crystal molecules, and thus a gray level is displayed.

In the in-cell touch LCD of this embodiment, a display and a touch is achieved with the upper array substrate 101 having an area greater than the lower array substrate 151 having the color filters 155, and a touch performance and an electrostatic performance can be improved.

In this embodiment, because of a reduction of a distance d2 between a finger 171 and the common electrode 123, a capacitance C2 therebetween increases and thus a finger sensitivity increases, and because of an increase of a touch area of the common electrode 123, a touch sensitivity increases in the finger touching.

In this embodiment, because of a reduction of a resistance of the touch line 125 caused by a reduction of a capacitance between the touch line 125 and the pixel electrodes 131, a touch sensitivity is improved.

Fabrication processes of the above-configured in-cell touch LCD according to this embodiment are explained with reference to FIG. 5.

Figure 5:
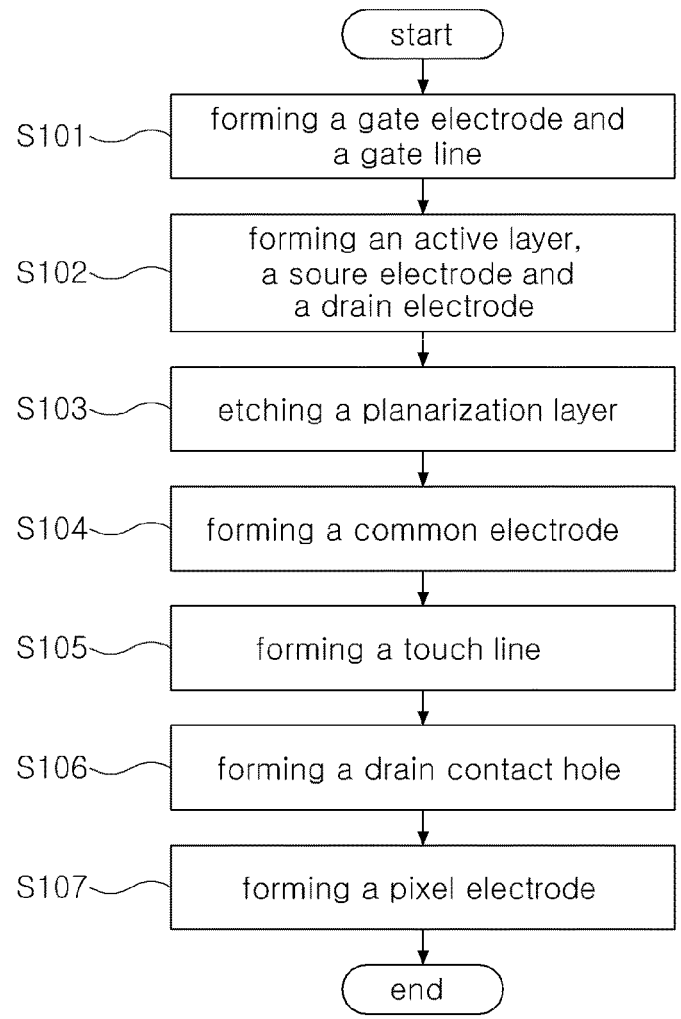
FIG. 5 is a flow chart illustrating fabrication processes of the borderless type in-cell touch LCD according to an embodiment of the present invention.

FIG. 5 is a flow chart illustrating fabrication processes of the borderless type in-cell touch LCD according to the embodiment of the present invention.

Referring to FIG. 5, the fabrication processes include a first mask process S101 of forming a gate line and a gate electrode on an upper array substrate for TFTs; a second mask process S102 of forming an active layer, a source electrode and a drain electrode on the gate electrode; a third mask process S103 of forming an opening portion, which exposes the drain electrode, in a planarization layer on the active layer, the source electrode and the drain electrode; a fourth mask process S104 of forming a common electrode on the planarization layer; a fifth mask process S105 of forming a touch line, which is spaced apart from the common electrode, on the planarization layer; a sixth mask process S106 of forming a drain contact hole, which exposes a part of the drain electrode below the opening portion, in a passivation layer on the planarization layer; and a seventh mask process S107 of forming a pixel electrode, which is connected to the drain electrode through the drain contact hole and overlaps the common electrode, on the passivation layer.

Further the fabrication processes include a mask process of forming a black matrix on an lower array substrate for color filters, and a mask process of forming color filters in respective openings of the black matrix on the lower array substrate.

As described above, the borderless type in-cell touch LCD of this embodiment has a flip structure. In other words, the upper array substrate for TFTs that has a greater area that the lower array substrate for color filters is formed on the lower array substrate, and to locate the pixel electrode at a top portion of the upper array substrate, the mask process for the common electrode and the mask process for the pixel electrode are switched.

Particularly, in the related art, the mask process for the common electrode is conducted after the mask process for the pixel electrode. In contrast, in this embodiment of the present invention, the mask process for the pixel electrode is conducted after the mask process for the common electrode.

A method for fabricating the in-cell touch LCD according to this embodiment of the present invention is explained with reference to FIGS. 6A to 6L.

FIGS. 6A to 6L are cross-sectional views illustrating a method for fabricating the borderless type in-cell touch LCD according to the embodiment of the present invention.

In the LCD of this embodiment, the upper array substrate 101 is configured as a TFT array substrate, the lower array substrate 151 is configured as a CF array substrate. In other words, unlike the related art, the relatively large-sized TFT array substrate is located on the CF array substrate.

Figure 6A:
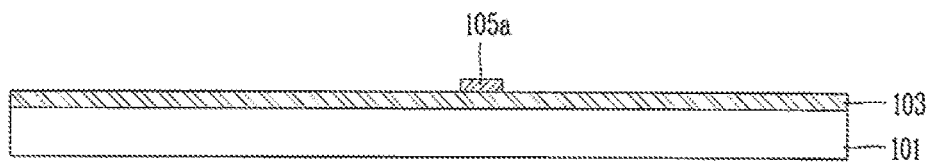
FIGS. 6A to 6L are cross-sectional views illustrating a method for fabricating the borderless type in-cell touch LCD according to an embodiment of the present invention.

Referring to FIG. 6A, a nitride insulating layer 103 is formed on a transparent substrate 101 having a plurality of pixel regions defined therein. The nitride insulating layer 103 may be made of one selected from nitride based materials.

The nitride insulating layer 103 blocks a displaying of a color (e.g., yellow) that is produced from electrode lines made of a metal material such as copper thus improves a luminous reflection and thus improves a display property.

Then, a first metal layer is deposited using a sputtering method, and is etched using a photolithography to form a gate line and a gate electrode 105a extending perpendicularly to the gate line. The first metal layer made be made of at least one selected from a conductive metal group including aluminum (Al), tungsten (W), copper (Cu), molybdenum (Mo), chromium (Cr), titanium (Ti), molybdenum tungsten (MoW), molybdenum titanium (MoTi), copper/molybdenum titanium (Cu/MoTi).

Figure 6B:
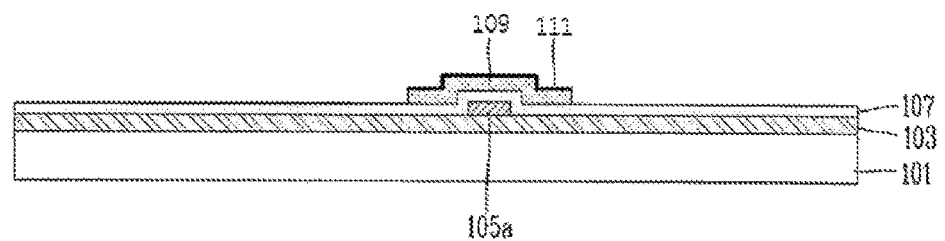

Then, referring to FIG. 6B, a gate insulating layer 107 is formed on the substrate 101 and covers the gate line and the gate electrode 105a. The gate insulating layer 107 is made of silicon nitride (SiNx) or silicon oxide (SiO$_2$).

A pure amorphous silicon layer (a-Si:H) and an impurity-doped amorphous silicon layer (n+ or p+) are sequentially deposited. The pure amorphous silicon layer (a-Si:H) and the impurity-doped amorphous silicon layer (n+ or p+) may be formed using a CVD (chemical vapor deposition) method or other method.

Then, the pure amorphous silicon layer (a-Si:H) and the impurity-doped amorphous silicon layer (n+ or p+) are selectively etched using a photolithography to form an active layer 109 and an ohmic contact layer 111 on the gate insulating layer 107 over the gate electrode 105a.

Figure 6C:
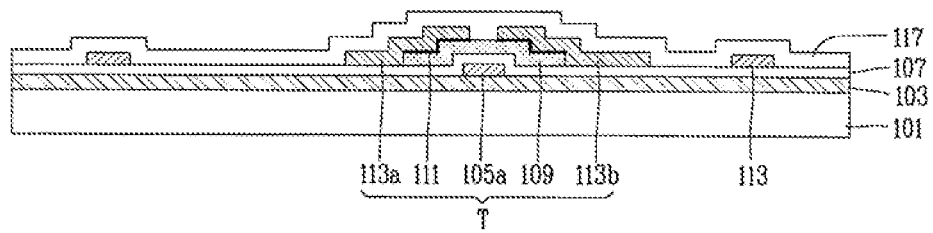

Then, referring to FIG. 6C, a second metal layer is formed on the gate insulating layer 107 and covers the active layer 109 and the ohmic contact layer 111. The second metal layer made be made of at least one selected from a conductive metal group including aluminum (Al), tungsten (W), copper (Cu), molybdenum (Mo), chromium (Cr), titanium (Ti), molybdenum tungsten (MoW), molybdenum titanium (MoTi), copper/molybdenum titanium (Cu/MoTi).

Then, the second metal layer is selectively etched using a photolithography to form a data line 113 crossing the gate line, a source electrode 113a extending from the data line 113, and a drain electrode 113b spaced apart from the source electrode 113a. When forming the source and drain electrodes 113a and 113b, a part of the ohmic contact layer 111 between the source and drain electrodes 113a and 113b is etched. Accordingly, the ohmic contact layer 111 is separated with respect to a channel region of the active layer 109.

Then, a first passivation layer 117 is formed on the substrate 101 having the source and drain electrodes 113a and 113b. The first passivation layer 117 may be made of an inorganic insulating material, for example, silicon oxide (SiNx) or silicon oxide (SiO$_2$).

Figure 6D:
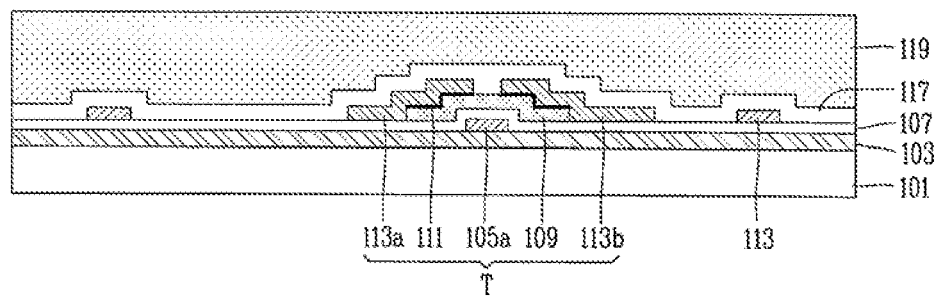

Then, referring to FIG. 6D, a planarization layer 119 is formed on the first passivation layer 117. The planarization layer 119 may be made of an organic insulating material, for example, polyimide or photoacryl.

Figure 6E:
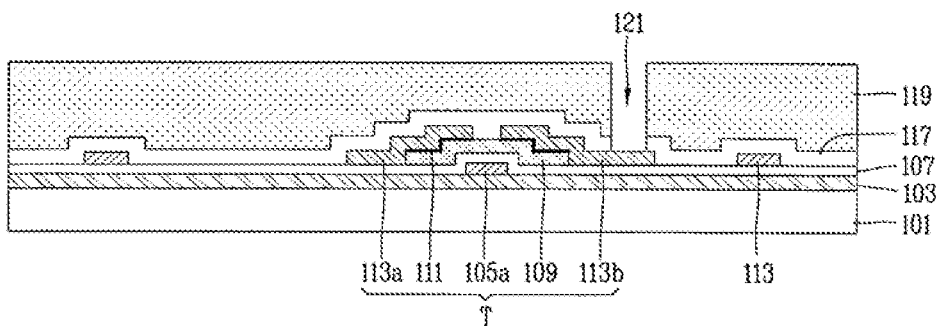

Then, referring to FIG. 6E, the planarization layer 119 and the first passivation layer 117 is selectively etched using a photolithography to form an opening portion 121 that exposes a part of the drain electrode 113b.

Figure 6F:
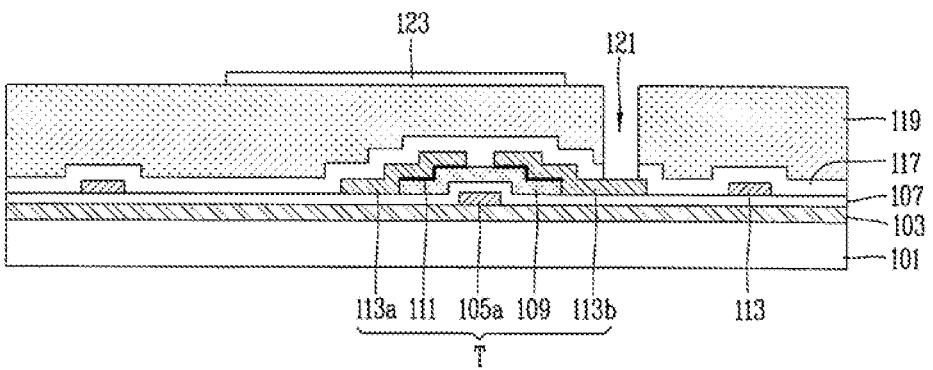

Then, referring to FIG. 6F, a first transparent conductive material layer is formed on the planarization layer 119 having the opening portion 121, and is etched using a photolithography to form a large-sized common electrode 123 of a plate shape. The first transparent conductive material layer may be made of one selected from a transparent conductive material group including ITO (indium-tin-oxide) and IZO (indium-zinc-oxide).

The common electrode 123 may be formed over a substantially entire area of the pixel region.

Figure 6G:
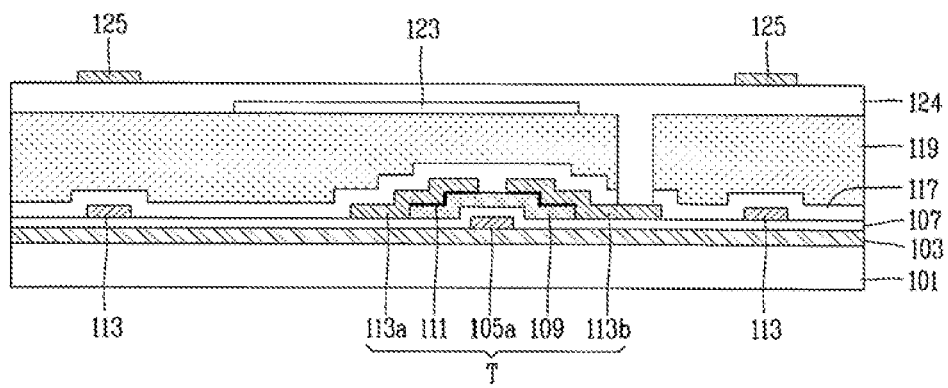

Then, referring to FIG. 6G, a second passivation layer 124 is formed on the planarization layer 119 and covers the common electrode 123. The second passivation layer 124 may be made of an inorganic insulating material, for example, silicon oxide (SiNx) or silicon oxide ($SiO_2$).

Then, a third metal layer is deposited on the second passivation layer 124. The third metal layer made be made of at least one selected from a conductive metal group including aluminum (Al), tungsten (W), copper (Cu), molybdenum (Mo), chromium (Cr), titanium (Ti), molybdenum tungsten (MoW), molybdenum titanium (MoTi), copper/molybdenum titanium (Cu/MoTi).

The third metal layer is etched using a photolithography to form a touch line 125.

Figure 6H:
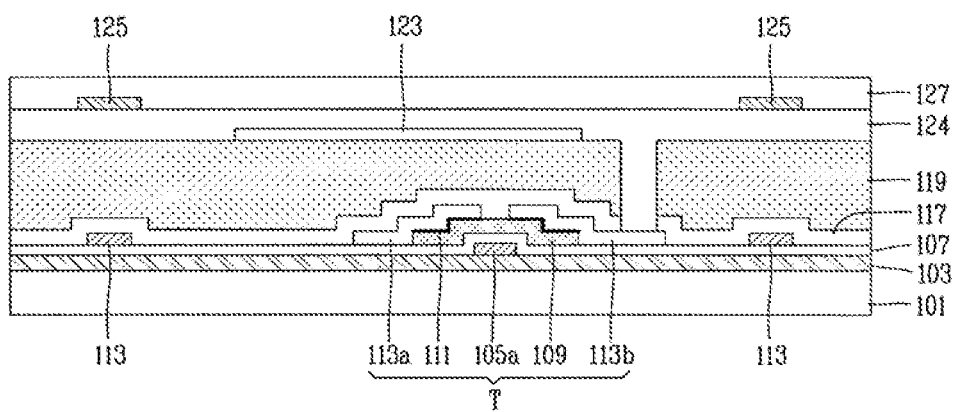

Then, referring to FIG. 6H, an inter-layered insulating layer 127 is formed on the second passivation layer 124 and covers the touch line 125. The inter-layered insulating layer 127 may be made of an inorganic insulating material, for example, silicon oxide (SiNx) or silicon oxide ($SiO_2$).

Figure 6I:
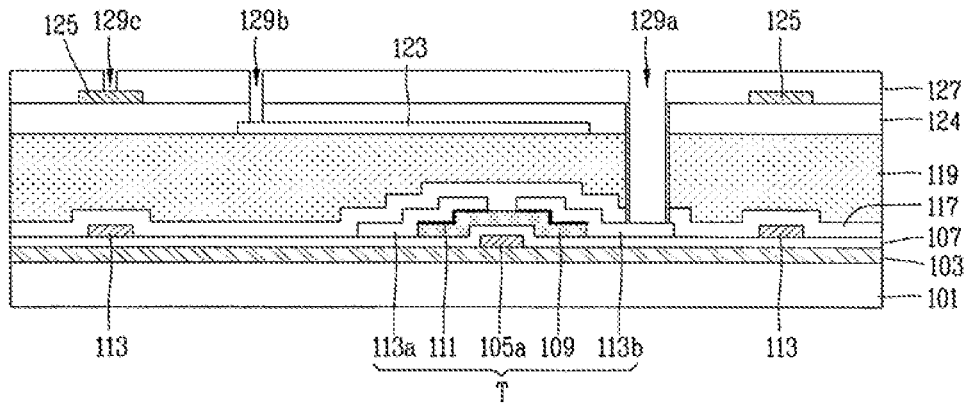

Then, referring to FIG. 6I, the inter-layered insulating layer 127 and the second passivation layer 124 are etched using a photolithography to form a drain contact hole 129a exposing the drain electrode 113b, a common electrode contact hole 129b exposing the common electrode 123, and a touch line contact hole 129c exposing the touch line 125.

Then, a second transparent conductive material layer is formed on the inter-layered insulating layer having the drain contact hole 129a, the common electrode contact hole 129b, and the touch line contact hole 129c.

Figure 6J:
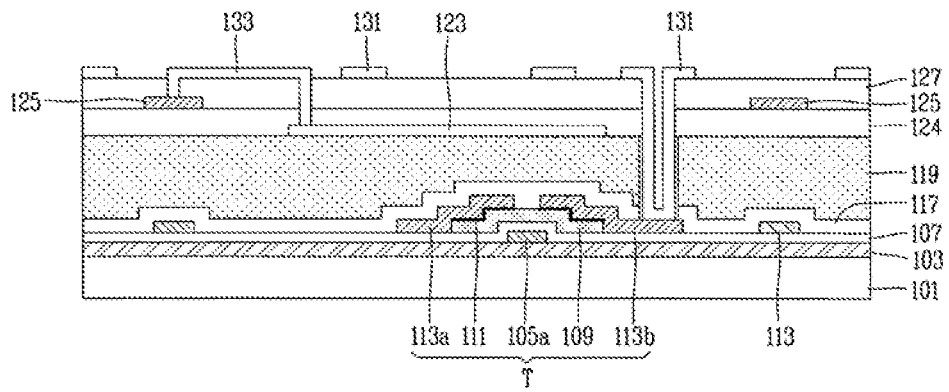

Then, referring to FIG. 6J, the second transparent conductive material layer is etched using a photolithography to form a pixel electrode 131 connected to the drain electrode 113b through the drain contact hole 129a, a connection line 133 connecting the common electrode 123 and the touch line 125 through the common electrode contact hole 129b and the touch line contact hole 129c. The second transparent conductive material layer may be made of one selected from a transparent conductive material group including ITO (indium-tin-oxide) and IZO (indium-zinc-oxide).

The pixel electrodes 131 overlapping the common electrode 123 in each of the red, green and blue pixel regions may be configured in bar shapes spaced apart from each other.

Then, an upper alignment layer is formed on the inter-layered insulating layer 127 having the pixel electrode 131 thereon.

Through the above processes, the TFT array substrate for the in-cell touch LCD of this embodiment may be fabricated.

Figure 6K:
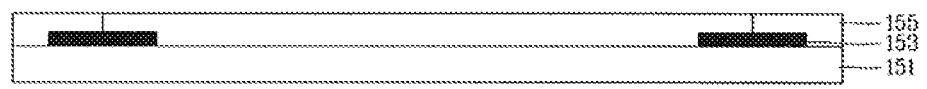

Referring to FIG. 6K, a black matrix 153 is formed on a CF array substrate i.e., a lower array substrate 151 spaced apart from and attached to the above TFT array substrate.

Then, red, green and blue color filters 155 are formed in the respective pixel regions of the lower array substrate 151. The black matrix 153 is located between the color filters 155.

In attaching the upper array substrate 101 and the lower array substrate 151, the black matrix 153 is arranged such that it overlaps a region except for the pixel regions of the upper array substrate 101, for example, overlaps the TFTs T, the gate lines and the data lines 113.

Then, a lower alignment layer is formed on the color filters 155.

Through the above processes, the CF array substrate for the in-cell touch LCD of this embodiment may be fabricated.

An ITO may be additionally formed on a rear surface (or a bottom surface or outer surface) of the lower array substrate 151 and be served to prevent a static electricity, and in this case, a static electricity prevention property can be improved.

Figure 6L:
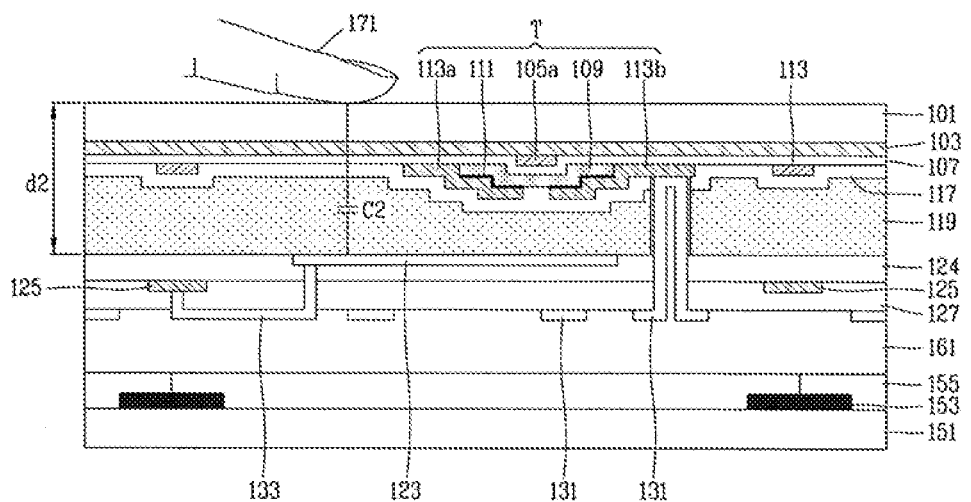

Then, referring to FIG. 6L, a liquid crystal layer 161 is injected between the upper array substrate 101 and the lower array substrate 151. Accordingly, the in-cell touch LCD of this embodiment may be fabricated.

Figure 7:
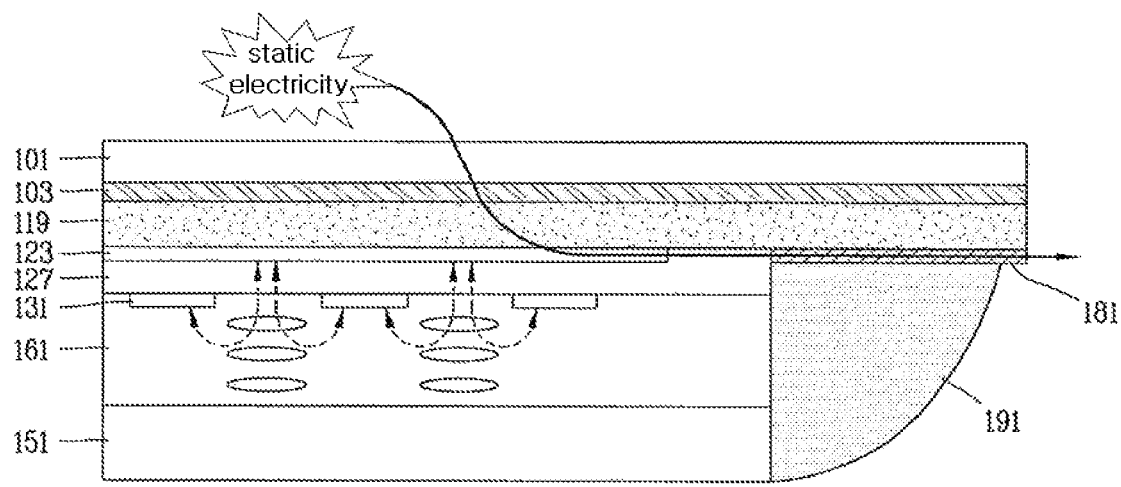
FIG. 7 is a schematic view illustrating a static electricity path of the borderless type in-cell touch LCD according to an embodiment of the present invention.

FIG. 7 is a schematic view illustrating a static electricity path of the borderless type in-cell touch LCD according to the embodiment of the present invention.

Referring to FIG. 7, an electrostatic discharge path may be produced through the common electrode 123, an Ag dot portion 191 that is formed at side portions of the upper array substrate 101 and the lower array substrate 151, and a ground line 181.

As described above, in the in-cell touch LCD of the embodiment(s) of the present invention, a display and a touch is achieved with the TFT array substrate having an area greater than the CF array substrate, and thus a touch performance and an electrostatic performance can be improved.

Further, according to the embodiments of the present invention, a 4-side borderless configuration/design is applied and the high-resistance transparent conductive layer of the related art used for a touching is eliminated, and thus fabrication processes can be simplified and a fabrication cost can be reduced.

Furthermore, according to the embodiments of the present invention, the nitride insulating layer is additionally formed between the TFT array substrate and the gate line to block a color that is produced from electrode lines made of a metal material such as copper, and thus a display property can be improved.

Moreover, according to the embodiments of the present invention, an ITO may be additionally formed at a polarizing plate structure and the CF array substrate to be served to prevent a static electricity, and a static electricity prevention property can be improved.

In addition, according to the embodiments of the present invention, because of a reduction of a distance between the finger and the common electrode, a capacitance therebetween increases and thus a finger sensitivity increases, and because of an increase of a touch area of the common electrode, a touch sensitivity increases in the finger touching.

Further, according to the embodiments of the present invention, because of a reduction of a resistance of the touch line caused by a reduction of a capacitance between the touch line and the pixel electrodes, a touch sensitivity is improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-cell touch liquid crystal display device, comprising:
   a lower array substrate;
   an upper array substrate that is on and faces the lower array substrate, and has an area greater than an area of the lower array substrate;
   a gate line and a data line that are on an inner surface of the upper array substrate and cross each other to define a pixel region;
   a thin film transistor on the inner surface of the upper array substrate;
   a planarization layer that is on the inner surface of the upper array substrate having the thin film transistor, and exposes a part of a drain electrode of the thin film transistor;
   a common electrode on the planarization layer;
   a passivation layer that is on the planarization layer and exposes the part of the drain electrode;
   a touch line on the passivation layer;
   an inter-layered insulating layer that is on the passivation layer, covers the touch line, and exposes the part of the drain electrode, the touch line and the common electrode;
   a plurality of pixel electrodes that are on the inter-layered insulating layer, overlap the common electrode, and are connected to the drain electrode; and
   a connection line connecting the touch line and the common electrode.

2. The in-cell touch liquid crystal display device of claim 1, further comprising:
   a nitride insulating layer that is below the gate line and a gate electrode, and on the inner surface of the upper array substrate.

3. The in-cell touch liquid crystal display device of claim 1, wherein the common electrode is formed in a large-sized plate shape.

4. The in-cell touch liquid crystal display device of claim 1, wherein the common electrode is formed over a substantially entire surface of the pixel region.

5. The in-cell touch liquid crystal display device of claim 1, further comprising:
   a transparent conductive layer on an outer surface of the lower array substrate.

6. The in-cell touch liquid crystal display device of claim 1, wherein the lower array substrate is a color filter array substrate, and the upper array substrate is a thin film transistor array substrate.

7. The in-cell touch liquid crystal display device of claim 1, wherein an electrostatic discharge path is produced through the common electrode, an Ag dot portion that is formed at side portions of the upper array substrate and the lower array substrate, and a ground line.

8. A method for fabricating an in-cell touch liquid crystal display device, the method comprising:
   providing a lower array substrate, and an upper array substrate that is on and faces the lower array substrate, wherein the upper array substrate has an area greater than an area of the lower array substrate;
   forming a gate line and a data line that are on an inner surface of the upper array substrate and cross each other to define a pixel region;
   forming a thin film transistor on the inner surface of the upper array substrate;
   forming a planarization layer that is on the inner surface of the upper array substrate having the thin film transistor, and exposes a part of a drain electrode of the thin film transistor;
   forming a common electrode on the planarization layer;
   forming a passivation layer that is on the planarization layer and exposes the part of the drain electrode;
   forming a touch line on the passivation layer;
   forming an inter-layered insulating layer that is on the passivation layer, covers the touch line, and exposes the part of the drain electrode, the touch line and the common electrode; and
   forming a plurality of pixel electrodes that are on the inter-layered insulating layer, overlap the common electrode, and are connected to the drain electrode, and a connection line connecting the touch line and the common electrode.

9. The method of claim 8, further comprising:
   forming a nitride insulating layer that is below the gate line and a gate electrode, and on the inner surface of the upper array substrate.

10. The method of claim 8, wherein the common electrode is formed in a large-sized plate shape.

11. The method of claim 8, wherein the common electrode is formed over a substantially entire surface of the pixel region.

12. The method of claim 8, further comprising:
    forming a transparent conductive layer on an outer surface of the lower array substrate.

13. The method of claim 8, wherein the lower array substrate is a color filter array substrate, and the upper array substrate is a thin film transistor array substrate.

14. The method of claim 8, wherein an electrostatic discharge path is produced through the common electrode, an Ag dot portion that is formed at side portions of the upper array substrate and the lower array substrate, and a ground line.

* * * * *